(12) United States Patent
Chen

(10) Patent No.: US 12,199,894 B2
(45) Date of Patent: Jan. 14, 2025

(54) METHOD AND APPARATUS FOR CSI FEEDBACK IN COMP (COORDINATED MULTI-POINT) SYSTEM

(71) Applicant: Texas Instruments Incorporated, Dallas, TX (US)

(72) Inventor: Runhua Chen, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 272 days.

(21) Appl. No.: 17/537,177

(22) Filed: Nov. 29, 2021

(65) Prior Publication Data

US 2022/0085933 A1 Mar. 17, 2022

Related U.S. Application Data

(63) Continuation of application No. 13/625,730, filed on Sep. 24, 2012, now Pat. No. 11,190,310.

(Continued)

(51) Int. Cl.
*H04L 5/00* (2006.01)
*H04B 7/024* (2017.01)
*H04B 7/06* (2006.01)

(52) U.S. Cl.
CPC ........... *H04L 5/0035* (2013.01); *H04B 7/024* (2013.01); *H04B 7/0626* (2013.01); *H04L 5/0057* (2013.01); *H04L 5/0064* (2013.01)

(58) Field of Classification Search
CPC ..... H04B 7/024; H04B 7/0626; H04L 5/0035; H04L 5/0064; H04L 5/0057

(Continued)

(56) References Cited

U.S. PATENT DOCUMENTS 11,190,310 B2 * 11/2021 Chen ................ H04L 5/0035
2010/0278109 A1 11/2010 Papasakellariou et al.

(Continued)

OTHER PUBLICATIONS

Prosecution History, U.S. Appl. No. 13/625,730, filed Sep. 24, 2012, 849 pages.

*Primary Examiner* — Christopher R Crompton
(74) *Attorney, Agent, or Firm* — Gregory J. Albin; Frank D. Cimino

(57) ABSTRACT

This invention is a technique for coordinate multi-point wireless transmission between a plurality of geographically separated transmission points (TP) and at least one user equipment (UE).

For coordinated multi-point communication (CoMP), UE measures the downlink wireless propagation channel corresponding to multiple geographically separated transmission points. The network configures multiple channel state indicator-reference signal (CSI-RS) resources, each of which is associated with a TP. UE measures the downlink channel using the multiple configured CSI-RS resources, and reports multiple CSIs in the uplink feedback channel. Each CSI report is defined as a "CSI-process", where a CSI-process with a lower CSI-process-index has a higher priority. Multiple CSI-processes can be reported periodically. Each periodic CSI feedback comprises a single CSI-process. Different CSI-processes are time-domain-multiplexed on different uplink feedback time instances, and are not multiplexed in the same feedback time instance. If two CSI-processes collide in the time domain, the CSI-process of a higher priority is reported, and the CSI-process of a lower priority is dropped. The UE can also feedback multiple CSI-processes in an aperiodic manner, where multiple CSI-processes are reported simultaneously. Aperiodic feedback by the UE is triggered by an n-bit CSI-triggering field in an uplink grant transmitted by the network. Each codepoint of (Continued)

the n-bit triggering field triggers feedback of a subset of CSI-processes configured by the higher-layer. If a UE is configured with CoMP and without carrier aggregation (CA), CSI-processes are ordered by decreasing CSI-process priority. If a UE is configured with CoMP and carrier aggregation simultaneously, CSI-processes are ordered firstly by decreasing carrier index, and secondly by decreasing CSI-process priority.

23 Claims, 5 Drawing Sheets

Related U.S. Application Data

(60) Provisional application No. 61/610,728, filed on Mar. 14, 2012, provisional application No. 61/539,104, filed on Sep. 26, 2011.

(58) Field of Classification Search
USPC .......................................................... 370/329
See application file for complete search history.

(56) References Cited

U.S. PATENT DOCUMENTS

| | | |
|---|---|---|
| 2012/0020230 A1 | 1/2012 | Chen et al. |
| 2012/0076017 A1 | 3/2012 | Luo et al. |
| 2012/0201163 A1 | 8/2012 | Jongren et al. |
| 2012/0250541 A1* | 10/2012 | Ko ........................ H04L 1/0026 370/252 |
| 2012/0257524 A1* | 10/2012 | Chen .................... H04W 24/10 370/252 |
| 2012/0257568 A1* | 10/2012 | Cai ....................... H04L 1/1812 370/328 |
| 2012/0281556 A1 | 11/2012 | Sayana et al. |
| 2013/0003788 A1* | 1/2013 | Marinier .............. H04B 7/0636 375/219 |
| 2013/0114554 A1 | 5/2013 | Yang et al. |
| 2014/0064109 A1 | 3/2014 | Krishnamurthy |

* cited by examiner

METHOD AND APPARATUS FOR CSI FEEDBACK IN COMP (COORDINATED MULTI-POINT) SYSTEM

CLAIM OF PRIORITY

This application is a continuation of U.S. application Ser. No. 13/625,730 filed Sep. 24, 2012, which claims the benefit of U.S. Provisional Application No. 61/539,104 filed Sep. 26, 2011 and U.S. Provisional No. 61/610,728 filed Mar. 14, 2012. The content of each of the above-identified applications is incorporated herein by reference in their entirety.

TECHNICAL FIELD OF THE INVENTION

The technical field of this invention is wireless communication such as wireless telephony.

BACKGROUND OF THE INVENTION

The present embodiments relate to wireless communication systems and, more particularly, to Coordinated Multi-Point (CoMP) transmission in which a single mobile unit communicates with plural transmission points.

In legacy wireless cellular systems such as Long Term Evolution (LTE) Rel. 8 to 10, a wireless network includes multiple base stations (eNodeBs, eNBs). Each base station may be configured as a single cell with its own cell ID. Mobile terminals or user equipment (UE) always connect to and exchange uplink (UL) data and downlink (DL) data with a connected cell in single-cell transmission/reception.

CoMP stands for Coordinated Multi-Point transmission. In CoMP multiple geographically separated transmission points (TP) coordinate with each other to jointly optimize downlink transmission activities. These include beam forming vectors, transmission power and/or scheduling decisions. In contrast to traditional wireless networks without cell coordination where signals from other transmission points impose co-channel interference, coordination within multiple TPs allows the signals to be cooperatively designed to reduce co-channel interference, boost received signal to noise ratio (SNR) and improve cell average throughput and cell-edge coverage. A transmission point herein may refer to a spatially separated transmission entity such as a base station, cell, macro eNB, pico eNB, femto eNB, remote radio heads, distributed antennas, other wireless transmission entity or a combination of these.

Channel state information reference symbol (CSI-RS) is used in LTE Rel. 10 for UE CSI feedback purpose. A UE measures the downlink channel from an eNB transmitter to the UE receiver by using CSI-RS, and reports the channel state information (CSI) measurement in the uplink. CSI-RS is UE-specific and unprecoded.

In legacy single-cell (or single-point) transmission, UE measures and reports the signal cell CSI of its serving cell. The serving cell configures a single-cell CSI-RS resource for downlink measurement. A CSI-RS resource corresponding to one cell may include 1, 2, 4, or 8 CSI-RS antenna ports.

SUMMARY OF THE INVENTION

This invention is a technique for coordinate multi-point wireless transmission between a plurality of geographically separated points and at least one user equipment.

For multi-point CoMP communication, the UE measures the downlink wireless propagation channels corresponding to multiple geographically separated transmission points (TP). The network configures multiple CSI-RS resources, each of which is associated with a TP. UE measures the downlink channel using the multiple configured CSI-RS resources, and reports multiple CSIs in the uplink feedback channel. Each CSI report is defined as a "CSI-process", where CSI-process with a lower CSI-process-index has a higher priority. Multiple CSI-processes can be reported periodically. Each periodic CSI feedback comprises a single CSI-process. Different CSI-processes are time-domain-multiplexed on different uplink feedback time instances, and are not multiplexed in the same feedback time instance. If two CSI-processes collide in the time domain, CSI-process of a higher priority is reported, and CSI-process of a lower priority is dropped. UE can also feedback multiple CSI-processes in an aperiodic manner, where multiple CSI-processes are reported simultaneously. Aperiodic feedback by the UE is triggered by an n-bit CSI-triggering field in an uplink grant transmitted by the network. Each codepoint of the n-bit triggering field triggers feedback of a subset of CSI-processes configured by the higher-layer. If UE is configured with CoMP and without carrier aggregation, CSI-processes are ordered by decreasing CSI-process priority. If UE is configured with CoMP and carrier aggregation simultaneously, CSI-processes are ordered firstly by decreasing carrier index, and secondly by decreasing CSI-process priority.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
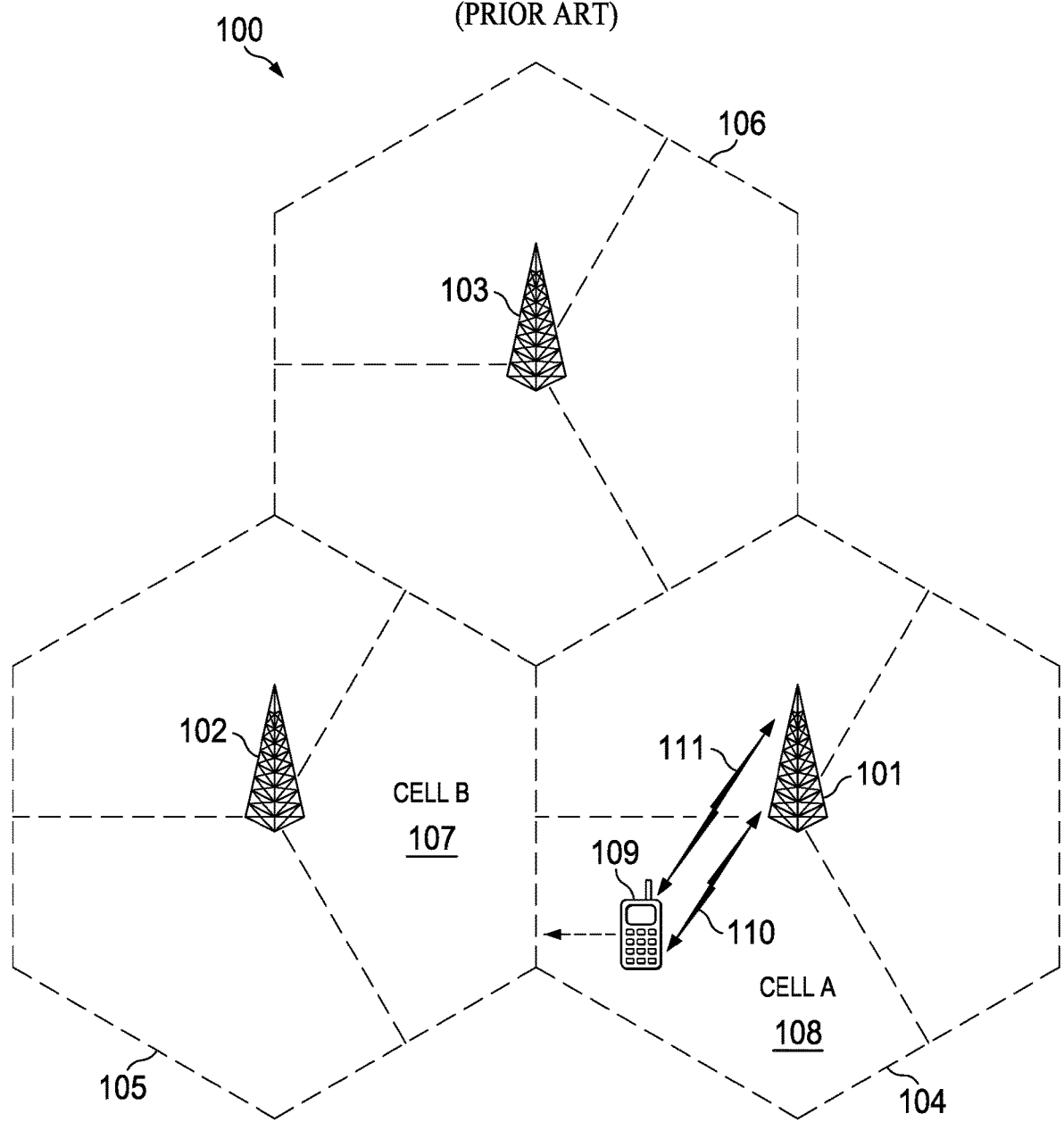
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CQI) from the SRS transmission.

Figure 2:
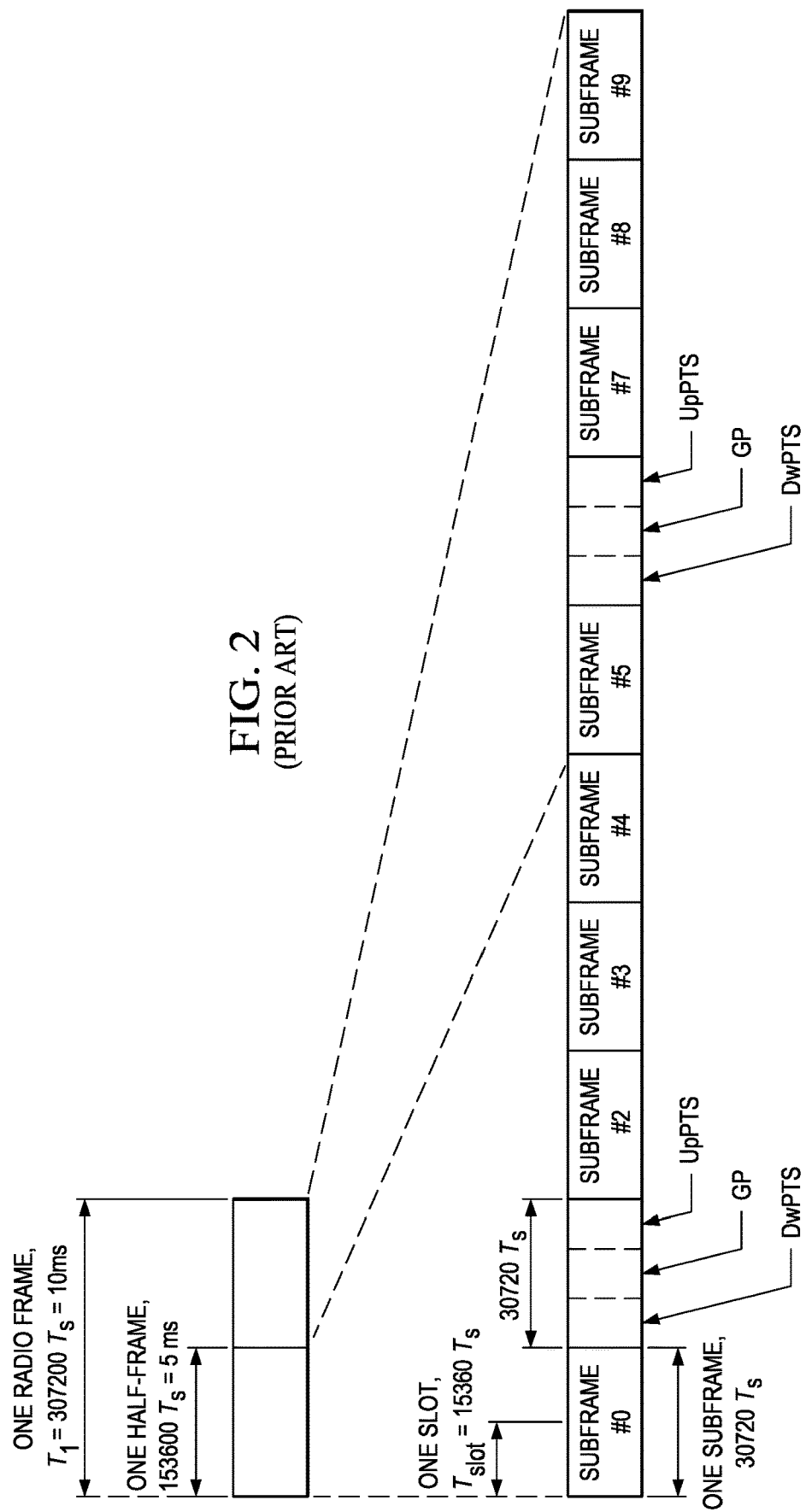
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table I shows applicable DL/UL subframe allocations.

TABLE I

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

DL CoMP CSI Measurement

CoMP stands for Coordinated Multi-Point Transmission, where multiple geographically separated transmission points (TP) such as base station, cell, macro eNB, pico eNB, femto eNB, or remote radio heads (RRH), distributed antennas, other wireless transmission entity, or a combination of these, coordinate with each other to jointly optimize the downlink beamforming signals. A pico eNB is a low-power base station having a smaller cell size for a more limited local coverage than a macro eNB. A femto eNB has an even further limited local coverage, generally in the range of 10 meters. A remote radio head (RRH) is an antenna located remotely from the base station handling the same transmitter or received signal as the base station. The RRH is coupled to the eNB via a non-air transmission link such as a wired radio frequency (RF) link or a fiber optic link. The eNB performs the baseband processing for all RRHs. In contrast to traditional wireless networks without cell coordination where signals from other transmission points impose co-channel interference, coordination within multiple TPs allows the signals to be cooperatively optimized in time/frequency/spatial domain to reduce co-channel interference. This boosts the received signal to noise ratio (SNR) and improves cell average throughput and cell-edge coverage at the UE.

Figure 3:
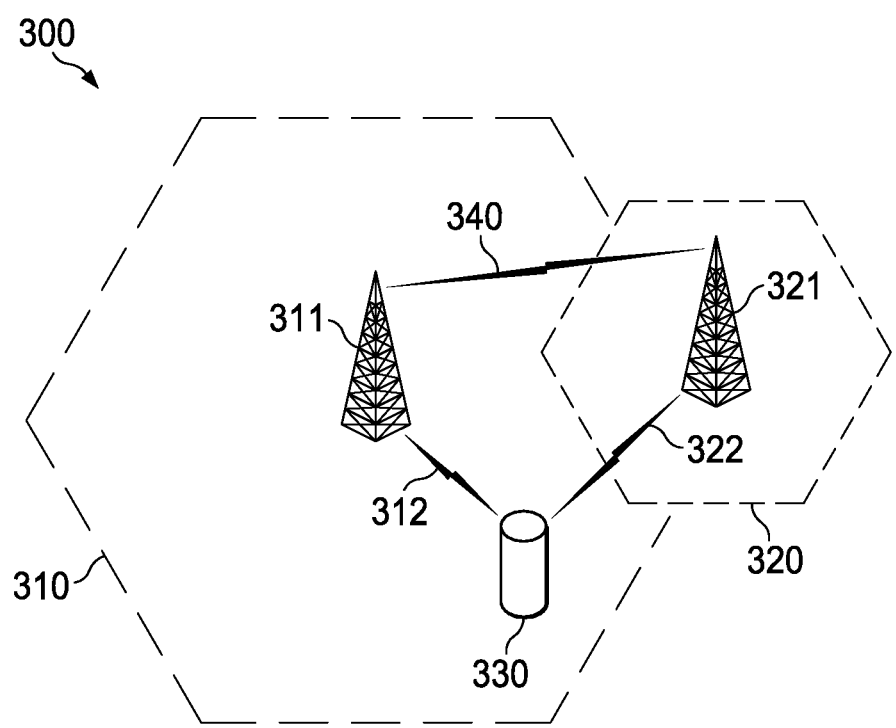
FIG. 3 illustrates an example Coordinated Multi-Point scenario.

FIG. 3 illustrates an example CoMP scenario 300. Cell 310 includes main base station (eNB) 311. Subsidiary cell 320 includes subsidiary base station (eNB) 321. User equipment (UE) 330 communicates with both base stations. Main eNB 311 communicates with UE 330 via two-way radio frequency link 312. Subsidiary eNB 321 communicates with UE 330 via two-way radio frequency link 322. FIG. 3 illustrates UE 330 within cell 310 and not within cell 320, but this is only an example. UE 330 may be located only within cell 320 and not within cell 310 or within both cells 310 and 320. The two eNBs 311 and 321 must generally communicate via a backhaul network 340.

Figure 4:
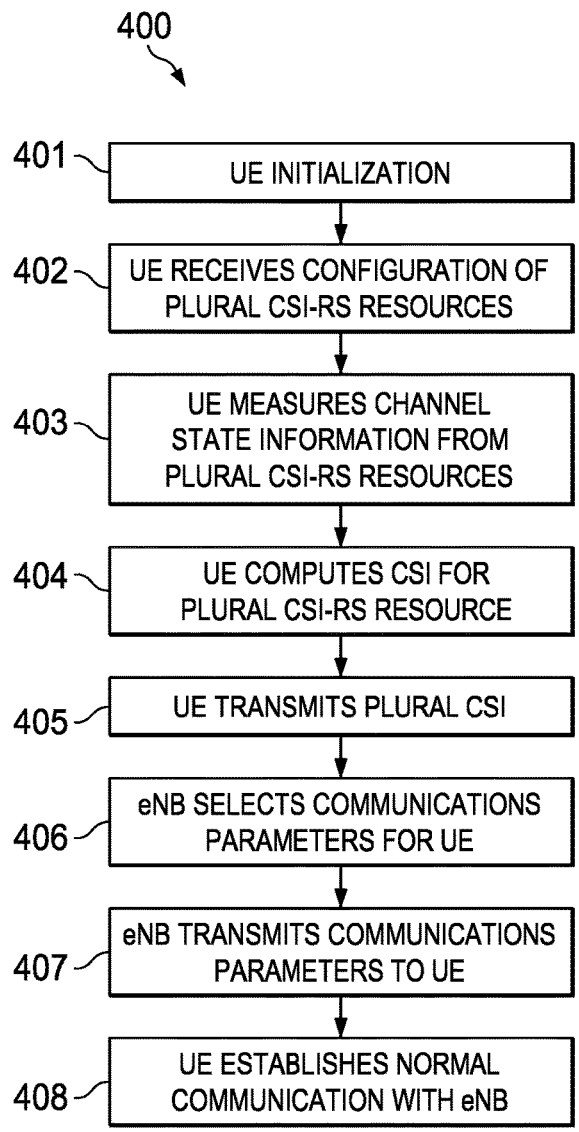
FIG. 4 illustrates the process 400 of UE feeding back CSIs and establishing data communication with eNB.

FIG. 4 illustrates the process 400 of the UE initiating communication. At block 401 the UE begins its initialization. This could be triggered by the UE powering up from an OFF state or the UE first coming within range of the corresponding eNB. UE performs cell search, connects to one strongest cell and obtains its cell ID. In the known art the cell ID can be determined from primary synchronization signal (PSS) and secondary synchronization signal (SSS) of the strongest cell. These are continuously or periodically transmitted. The network subsequently configures the UE with CoMP communication where the UE not only communicates with the strongest cell, but also with multiple other cells. This requires UE to measure the multiple channel state information reference signal (CSI-RS) resources of multiple cells. At this stage the UE does not know the CSI-RS sequence of other cells, because the UE does not know the cell IDs of other cells involved in CoMP coordination. At block 402 the CSI-RS resource of each cell in CoMP coordination is configured by higher-layer signaling to the UE. This higher-layer signaling could be transmitted to the UE by the strongest cell which the UE is synchronized to. Upon determination of the CSI-RS resources, in block 403 the UE measures channel state information on the CSI-RS resource from each eNB. In a CoMP scenario there are plural such eNBs, each with its own CSI-RS resource. At least one of the communicating eNBs signals the UE which CSI-RS resources to measure. In block 404 the UE uses plural CSI-RS resources to compute a Channel State Information (CSI) for each of configured CSI-RS resources. In block 405 the UE transmits these CSI measurements. The UE does not control which eNB receives this signal. The UE transmits this signal and one or more eNBs receive it.

In block 406 an eNB selects communication parameters for the UE to use in normal communications, which may include the physical resource blocks for data transmission, modulation and coding scheme, beamforming vectors, and transmission point(s) used for downlink transmission. These communications parameters may have the UE exchanging UL and DL signals with one or more of the plural eNBs. The eNB bases this selection on the plural CSI responses from the UE (block 405). In block 407 the communicating eNB(s) transmit information that the UE needs to establish a communications link with the eNB. In block 408 the UE establishes normal communications in accordance with these communication parameters.

DL CoMP CSI Feedback

CSI measurement/feedback is an essential component that plays a significant role in CoMP operation, for transmission set selection, beamforming computation, multiuser pairing, link adaptation and scheduling. For CoMP the UE feedback (blocks 404 and 405) needs to contain multiple CSI measurements corresponding to multiple transmission points. In order to do this higher layer signaling configures multiple CSI-RS resources. Each CSI-RS resource corresponds to a unique single-cell CSI-RS pattern. The linkage between each configured CSI-RS resource and each transmission point is configured at the network and is transparent to the UE. The UE measures the CSI-RS of each CSI-RS resource and reports the corresponding CSI. Each CSI is defined as a "CSI-process" that reflects a set of recommended transmission properties, which may include rank indicator (RI), precoding matrix indicator (PMI), and channel quality indicator (CQI). Rank indicator is the number of data layers that the UE recommends for downlink transmission. PMI is an index to a precoding matrix recommended for downlink data transmission. CQI is an indicator to the signal strength of the downlink channel, which may be signal-to-noise ratio (SNR) or the size of a downlink packet. Thus the UE performs measurements on plural CSI-RS resources for this multiple CSI feedback operation. Each CSI-process can be configured by the higher-layer signaling with a CSI-process-index. Configuration of CSI-process-index is a network implementation issue, based for example on UL received signal strength or on vendor-specific CoMP scheduling algorithm. Additionally, each CSI-process may be configured with a different priority level. It is possible that the priority order of a CSI-process is implicitly tied to the CSI-process-index, where CSI-process with a lower CSI-process-index has higher priority.

Periodic CSI Feedback

UE feedback of CSI can be configured to be periodic on a specific uplink physical channel. In legacy LTE Rel. 8-10 system with single-cell operation, UE can be configured to report single-cell CSI periodically on the Physical Uplink Control Channel (PUCCH). Periodic CSI feedback on PUCCH is configured with a UE-specific periodicity and time-domain offset, both in unit of subframe (1 ms). Using the periodicity and offsets, UE understands which set of uplink subframes shall be used for CSI feedback.

PUCCH is a narrow control channel pipeline. It has a small payload and must meet a stringent reliability requirement to ensure cell coverage. CSI feedback on PUCCH typically has to be limited to a small payload. For CoMP CSI feedback where multiple CSIs are to be reported, it is undesirable to multiplex several CSI reports in one PUCCH. This is particular important considering that most UEs receiving CoMP transmission have poor channel geometry, and ensuring cell coverage is challenging. CSI multiplexing on PUCCH should be avoided in order not to compromise the uplink control signal coverage. Therefore, each PUCCH should report a single CSI-process. Feedback of multiple CSI-processes on the PUCCH channel is to be enabled by time-domain multiplexing, where one PUCCH transmission feeds back one CSI-process. Usually, the network may configure different PUCCH reporting periodicities and/or offsets for different CSI-processes, so that they will not be reported in the same uplink subframe. However if two CSI reports occur in the same uplink subframe, a collision handling mechanism is needed. In case of CSI collision on one PUCCH, one CSI is reported, and other CSI are dropped. A dropping rule can be defined based on the CSI-process priority. Different CSI-processes may be configured with different priorities by the higher-layer. If CSI of a higher priority collides with a CSI with lower priority on PUCCH, CSI of higher-priority is reported, and CSI of lower priority is dropped. If priority of CSI-process is implicitly and inversely tied to the CSI-process-index, in the event of CSI collision, CSI-process of a lower CSI-process-index is reported, while CSI-process of a higher CSI-process-index is dropped.

Advanced CSI information may be optionally reported by UE. For instance, such advanced CSI feedback includes "inter-CSIRS-resource CSI" which reflects the spatial correlation between different TPs, in the form of a co-phasing component, or "aggregated CQI" that reflect the SNR value of simultaneous transmission from multiple TPs on the same spectrum.

If inter-CSIRS-resource feedback is supported, one PUCCH carries feedback defined by either per-CSIRS-resource CSI or inter-CSIRS-resource CSI. PUCCH carrying inter-CSIRS-resource CSI and PUCCH carrying per-CSIRS-resource CSI are TDM-multiplexed by configuring different PUCCH periodicities and/or offsets. PUCCH caring inter-CSIRS-resources are TDM-multiplexed for different CSIRS-resources. If PUCCHs carrying per-CSIRS-resource CSI and inter-CSIRS-resource CSI collide in the time domain, inter-CSIRS-resource CSI is dropped.

If aggregated CSI feedback is chosen, one PUCCH carries per-CSIRS-resource CSI for one CSIRS-resource, or aggregated CSI. PUCCH carrying inter-CSIRS-resource CSI and PUCCH carrying aggregated CSI are TDM-multiplexed by configuring different PUCCH periodicities and/or offsets. If PUCCHs carrying per-CSIRS-resource CSI and aggregated CSI collide in the time domain, per-CSIRS-resource CSI is dropped. If PUCCH carrying inter-CSIRS-resource CSI and aggregated CSI collide in the time domain, inter-CSIRS-resource CSI is dropped.

Aperiodic CSI Feedback

UE feedback of CSI can be aperiodic, where the UE receives a trigger from the network and transmits the CSI measurement in the uplink. For instance, a 1-bit CSI-triggering field in the uplink grant can be used for triggering aperiodic CSI report. An uplink grant is a downlink control signal transmitted by the network which carries uplink scheduling information including but not limited to the frequency assignment, modulation and coding scheme. If the 1-bit CSI-triggering field in the uplink grant is set to "1", UE encodes and reports CSI in the Physical Uplink Shared Channel (PUSCH).

Although multiple CSIs can be reported simultaneously for DL CoMP, it is not always necessary to report all CSIs all the time. At a particular time, the network may trigger the UE to report a subset of CSIs that the network considers necessary for downlink scheduling at a particular system operation environment. This also helps to reduce the CSI feedback payload so that the UE is not required to always feedback the maximum CSI payload. Instead, UE is triggered to only feedback a subset of CSIs deemed important by the downlink scheduler, resulting in less UE power consumption and better uplink coverage.

To achieve this goal, a combination of Radio Resource Control (RRC) configuration and dynamic signaling is used. The uplink grant has an n-bit CSI-triggering field, where each codepoint of the CSI-triggering field is used to trigger aperiodic feedback of a subset of CSIs. The subset of CSIs corresponding to each codepoint of the n-bit triggering field is semi-statically configured by higher-layer signaling. An embodiment is given in Table II for 2-bit CSI-triggering field. CSI-triggering field is optionally termed as CSI request field.

TABLE II

CSI Request for CoMP

| Value of CSI request field | Description |
| --- | --- |
| '00' | No aperiodic CSI report is triggered |
| '01' | Aperiodic CSI report is triggered for transmission point k |
| '10' | Aperiodic CSI report is triggered for a $1^{st}$ set of transmission points (CSI-RS subsets) configured by higher layers |
| '11' | Aperiodic CSI report is triggered for a $2^{nd}$ set of transmission points (CSI-RS subsets) configured by higher layers |

A wireless system may operate on multiple carriers, e.g. carrier aggregation (CA) in LTE Release 10. Herein a carrier refers to a segment of spectrum that is independently operable for a wireless technology. With carrier aggregation, the network may configure a UE to operate on multiple adjacent or non-adjacent frequency spectrums simultaneously to increase the downlink/uplink throughput. This is important to network operators with discontinuous frequency spectrum, which is usually extremely expensive to acquire. It is beneficial for wireless spectrum re-farming so that when an old wireless system (standard) is no longer deployed, the old spectrum can be used for operation of a new wireless system jointly with an new carrier. Each carrier is defined as a "cell" or a "CC", and configured with a different cellID. Under carrier aggregation, a UE is always connected to the network on a primary cell. The primary cell is configured with the lowest cellID. A UE can be optionally configured to be operable on additional carriers called secondary cells, to increase the downlink throughput. Secondary cells can be turned OFF by the network on a UE-specific manner. Multiple CSIs can be reported for multiple configured cells.

If CoMP and CA are simultaneously configured for a UE, the CSI triggering field in the UL grant may correspond to a combination of DL CCs as well CoMP TP, configured by higher layer. Herein, the uplink grant may aperiodically trigger reporting CSI feedback for a subset of carriers or CoMP TPs. An example is given in Table III.

TABLE III

CSI Request for CoMP with Carrier Aggregation

| Value of CSI request field | Description |
| --- | --- |
| '00' | No aperiodic CSI report is triggered |
| '01' | Aperiodic CSI report is triggered for serving cell c and transmission point k |
| '10' | Aperiodic CSI report is triggered for a $1^{st}$ set of serving cell c and transmission points k (CSI-RS subsets) configured by higher layers |
| '11' | Aperiodic CSI report is triggered for a $2^{nd}$ set of serving cell c and transmission points k (CSI-RS subsets) configured by higher layers |

The uplink grant that a UE is configured to monitor is associated with the uplink transmission mode that the UE is configured to operate with. In addition to the regular UL grant, a UE is also required to monitor a fall-back uplink grant in the common control channel. This fall-back uplink grant has a small payload and has only a 1-bit CSI triggering field. The fall-back uplink grant is usually used for fall-back scheduling e.g. when UE is RRC-reconfigured by the network, or experiences severe channel degradation so that a normal uplink grant cannot be received reliably. The content of the CSI feedback when UE receives CSI triggering in the fall-back uplink grant may include all CSI-processes, or a subset of the CSI-processes. It is important to note that maintaining a reliable connection to the network is crucial for the UE in fall-back operation. To this end, the 1-bit triggering field should be used to trigger a single CSI feedback. If a UE is configured with CoMP and not with CA, the 1-bit triggering field in the uplink grant, when set to "1", triggers a single CSI report. In one embodiment, the CSI-process with the lowest CSI-process ID, or with the highest priority, is reported. If a UE is configured with both CoMP and CA, the 1-bit triggering field in the fall back uplink grant, triggers a single CSI feedback for the primary cell. In one embodiment, the CSI-process for the primary cell with the lowest CSI-process ID is reported.

Encoding of Multiple CSIs on PUSCH

Aperiodic CSI reports are encoded before being transmitted in the uplink feedback channel on PUSCH. For instance in LTE, tail-biting convolutional code (TBCC) is used for CSI encoding on PUSCH. For CoMP, multiple CSI-processes need to be ordered to form a set of ordered CSI processes, encoded and transmitted on PUSCH.

Figure 5:
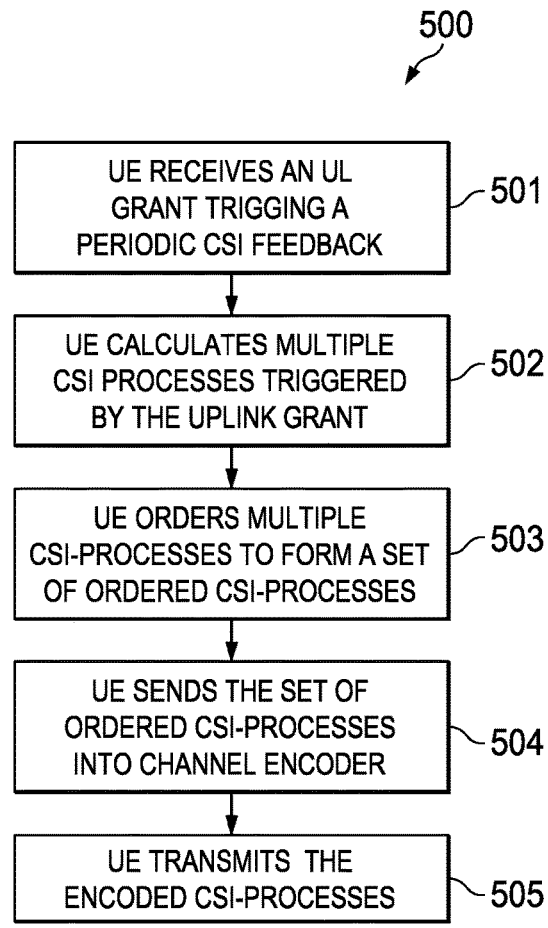
FIG. 5 illustrates the process of UE aperiodically reporting CSI.

FIG. 5 illustrates the process 500 of the UE ordering the triggered set of CSI-processes. At block 501 the UE receives an uplink grant triggering aperiodic CSI report. At block 502 the UE calculates multiple CSI-processes that are triggered by the n-bit CSI-triggering field in the uplink grant. At block 503 UE orders the triggered CSI-processes to form a set of ordered CSI-processes. At block 504 UE sends the set of ordered CSI-processes into a channel encoder. At block 505 UE transmits the encoded CSI-processes in the uplink feedback channel.

If the UE is configured with CoMP and without CA, CSI processes are ordered by decreasing CSI-process priority. In one embodiment, each CSI-process is configured with a different CSI-process-index, where CSI-process of a lower CSI-process-index has a higher priority. Correspondingly, CSI-process on PUSCH is ordered by increasing CSI-process indexes.

Figure 6:
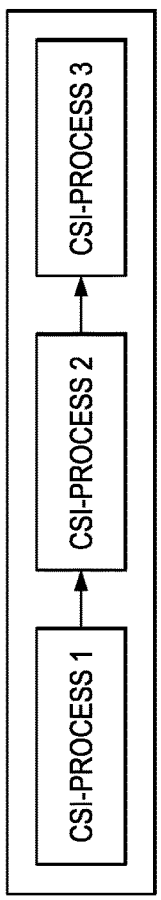
FIG. 6 illustrates an ordering of CSI-processes for a UE configured with CoMP and without carrier aggregation.

FIG. 6 illustrates an ordering of CSI-processes for a UE configured with CoMP and without CA. The CSI processes are ordered by increasing CSI-process-indexes, which is equivalent to ordering by decreasing CSI-process priority.

If CoMP and CA are simultaneously configured for a UE, CSI shall be ordered according to CSI-process priority and carrier (CC) index. In one embodiment, the set of CSI-processes triggered by the uplink grant is ordered firstly by decreasing CSI-process priority, secondly by increasing CC index. In another embodiment, the set of CSI-processes triggered by the uplink grant is ordered firstly by increasing CC index, secondly by decreasing CSI-process priority. The second embodiment is preferred because CSIs corresponding to the same carrier are placed in a consecutive manner. Once the eNB receives the all CSIs of one carrier, it may immediately start scheduling on that carrier, before CSIs for other carriers are available. This reduces the scheduling latency. Correspondingly, each CSI-process is configured with a different CSI-process-index, where CSI-process of a lower CSI-process-index has a higher priority. CSI-processes are then ordered first by increasing CC index, then by increasing CSI-process-index.

Figure 7:
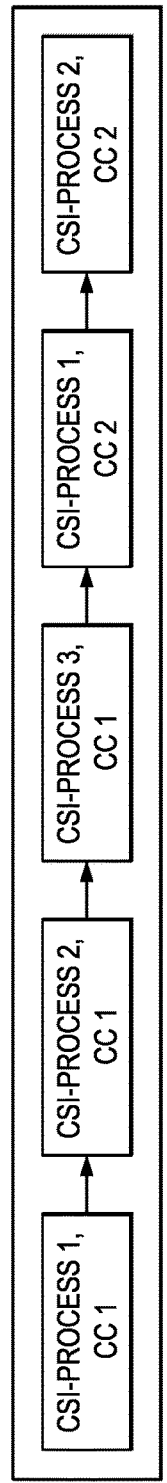
FIG. 7 illustrates an ordering of CSI-processes for a UE configured with CoMP and carrier aggregation simultaneously.

FIG. 7 illustrates an ordering of CSI-processes for a UE configured with CoMP and CA simultaneously. The UE is configured with two downlink cells (CCs), which are CC1 and CC2. The uplink grant triggers 3 CSI-processes to be reported on CC1, and 2 CSI-processes to be reported on CC2. The ordered set of CSI-processes includes the 3 CSI-processes for CC1, by increasing CSI-process-index, followed by two CSI-processes for CC2, by increasing CSI-process-index.

Figure 8:
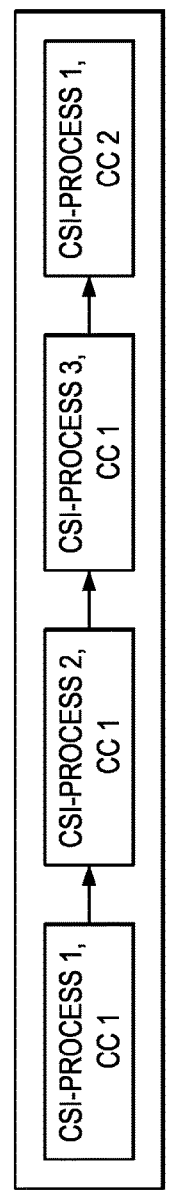
FIG. 8 illustrates an ordering of CSI-processes for a UE configured with CoMP on one carrier and without CoMP on another carrier.

A UE may be configured with CoMP on one CC and without CoMP on another CC. On the CC where CoMP is configured, multiple CSI-processes are reported. On the CC where CoMP is not configured, a single CSI-process is reported. FIG. 8 illustrates an ordering of CSI-processes for a UE configured with CoMP on CC1 and without CoMP on CC2. The ordered set of CSI-processes includes the 3 CSI-processes for CC1, by increasing CSI-process-index, followed by one CSI-process for CC2.

Figure 9:
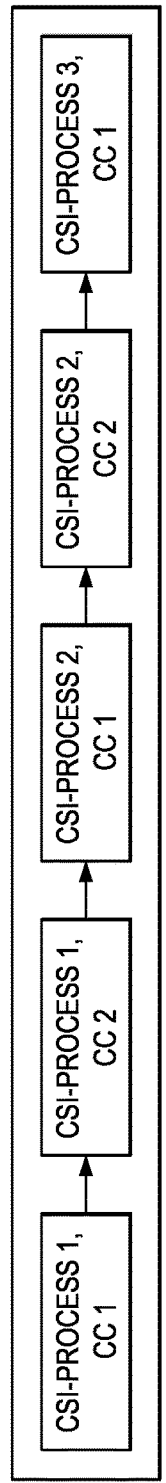
FIG. 9 illustrates an ordering of CSI-processes for a UE configured with CoMP and carrier aggregation simultaneously.

FIG. 9 illustrates an ordering of CSI-processes for a UE configured with CoMP and CA simultaneously, where CSI ordering is firstly by increasing CSI-process-index, secondly by increasing CC index. The UE is configured with two downlink cells (CCs), which are CC1 and CC2. The uplink grant triggers 3 CSI-processes to be reported on CC1, and 2 CSI-processes to be reported on CC2.

What is claimed:

1. A method, comprising:
   transmitting from a user equipment (UE) channel state information (CSI) feedback determined based on a first CSI-process and a second CSI-process in an uplink feedback channel, the first CSI process being configured with a first CSI reference signal (CSI-RS) configuration, the second CSI process being configured with a second CSI-RS configuration, each of the first and second CSI-RS configurations having a scrambling sequence semi-statically configured by radio resource control (RRC) signaling; and
   receiving from at least two eNodeBs (eNBs) located at geographically separated points data transmitted to said UE from said two eNodeBs (eNBs) based on the CSI feedback.

2. The method of claim 1 wherein a CSI reporting mode is independently configured for said first CSI-process and said second CSI-process.

3. The method of claim 1 wherein said UE transmits said first CSI-process and said second CSI-process periodically.

4. The method of claim 3 wherein the periodicities of said first CSI-process and said second CSI-process are independently configured.

5. The method of claim 3 wherein said UE transmits said first CSI-process on a first time instance, and transmits said second CSI-process on a second time instance.

6. The method of claim 3 wherein said UE transmits the CSI-process of a higher priority, and drops the CSI-process of a lower priority when said first CSI-process and said second CSI-process occur on the same time instance.

7. The method of claim 1 wherein said UE transmits said first CSI-process and said second CSI-process simultaneously on the same time instance.

8. The method of claim 7 wherein transmission is triggered by an n-bit field in an uplink grant, n>=1.

9. The method of claim 8 wherein the UE transmits said first CSI-process and not said second CSI-process when n=1.

10. The method of claim 8 wherein said set of CSI-processes transmitted by the UE, corresponding to a codepoint of the n-bit field, are semi-statically configured by higher-layer signalling.

11. The method of claim 8, further comprising the UE:
   ordering the first CSI-process and the second CSI-process to form an ordered set of CSI-processes, where ordering is firstly by increasing cell index, and secondly by increasing CSI-process priority, and
   encoding the ordered set of CSI-processes, and
   transmitting the encoded CSI-processes in the uplink feedback channel.

12. The method of claim 9 wherein said first CSI-process is configured with a higher priority than said second CSI-process.

13. The method of claim 9 wherein said first CSI-process is configured with a smaller CSI-process-index than said second CSI-process.

14. An apparatus, comprising:
   a receiver enabled to receive a UE transmission of channel state information (CSI) feedback determined based on a first CSI-process and a second CSI-process in the uplink feedback channel, the first CSI process being configured with a first CSI reference signal (CSI-RS) configuration, the second CSI process being configured with a second CSI-RS configuration, each of the first and second CSI-RS configurations having a scrambling sequence semi-statically configured by radio resource control (RRC) signaling,
   a transmitter enabled to transmit data to said UE based on the CSI feedback.

15. The apparatus of claim 14 wherein a CSI reporting mode is independently configured for said first CSI-process and said second CSI-process.

16. The apparatus of claim 14 wherein said first CSI-process and said second CSI-process is received periodically.

17. The apparatus of claim 16, wherein said first CSI-process is received in a first time instance, and said second CSI-process is received in a second time instance.

18. An apparatus, comprising:
   a transmitter enabled to transmit to an eNodeB (eNB) channel state information (CSI) feedback determined based on a first CSI-process and a second CSI-process in an uplink feedback channel, the first CSI process being configured with a first CSI reference signal (CSI-RS) configuration, the second CSI process being configured with a second CSI-RS configuration, each of the first and second CSI-RS configurations having a scrambling sequence semi-statically configured by radio resource control (RRC) signaling.

19. The apparatus claim 18 wherein a CSI reporting mode for said first CSI-process and said second CSI-process is independently configured.

20. The apparatus of claim 19 wherein said first CSI-process and said second CSI-process is transmitted periodically.

21. The apparatus of claim 19 further comprises:
   an ordering module enabled to order a set of CSI-processes, wherein ordering is firstly by increasing cell index, and secondly by increasing CSI-process priority, and
   an encoder to encode said ordered set of CSI-processes, and
   a transmitter to transmit said encoded CSI-processes in the uplink feedback channel.

22. The apparatus of claim 20 wherein said UE transmits said first CSI-process on a first time instance, and transmits said second CSI-process on a second time instance.

23. The apparatus of claim 20 wherein said CSI-process of a higher priority is transmitted and said CSI-process of a lower priority is dropped when said first CSI-process and said second CSI-process occur on the same time instance.

* * * * *